(12) United States Patent
Nilsson et al.

(10) Patent No.: US 12,110,941 B2
(45) Date of Patent: Oct. 8, 2024

(54) CENTRIFUGAL PENDULUM ABSORBER

(71) Applicant: Volvo Truck Corporation, Gothenburg (SE)

(72) Inventors: Ola Nilsson, Varberg (SE); Pär Öhrfeldt, Mölnlycke (SE); Ödül Bilen, Hisings Backa (SE)

(73) Assignee: Volvo Truck Corporation, Gothenburg (SE)

( * ) Notice: Subject to any disclaimer, the term of this patent is extended or adjusted under 35 U.S.C. 154(b) by 349 days.

(21) Appl. No.: 17/606,037

(22) PCT Filed: Apr. 25, 2019

(86) PCT No.: PCT/EP2019/060654
§ 371 (c)(1),
(2) Date: Oct. 24, 2021

(87) PCT Pub. No.: WO2020/216449
PCT Pub. Date: Oct. 29, 2020

(65) Prior Publication Data
US 2022/0205510 A1    Jun. 30, 2022

(51) Int. Cl.
*F16F 15/14* (2006.01)
*F16F 15/173* (2006.01)

(52) U.S. Cl.
CPC .......... *F16F 15/145* (2013.01); *F16F 15/173* (2013.01)

(58) Field of Classification Search
CPC ........ F16F 15/145; F16F 15/16; F16F 15/162; F16F 15/163; F16F 15/165; F16F 15/173
See application file for complete search history.

(56) References Cited

U.S. PATENT DOCUMENTS

| | | | |
|---|---|---|---|
| 6,955,249 B2 | 10/2005 | Biasiotto et al. | |
| 8,931,607 B2 | 1/2015 | Bai et al. | |
| 9,435,397 B2 * | 9/2016 | Aijima | F16F 15/145 |

(Continued)

FOREIGN PATENT DOCUMENTS

| | | |
|---|---|---|
| CN | 1616841 A | 5/2005 |
| CN | 102141113 A | 8/2011 |

(Continued)

OTHER PUBLICATIONS

Chinese Office Action for CN Application No. 201980095524.4, mailed Nov. 15, 2022 9 pages.

(Continued)

*Primary Examiner* — Vishal R Sahni
(74) *Attorney, Agent, or Firm* — Sage Patent Group

(57) ABSTRACT

The invention relates to a centrifugal pendulum absorber for a flywheel, including,
  a plurality of pendulum weights being arranged circumferentially around a center axis of the centrifugal pendulum absorber, wherein,
the centrifugal pendulum absorber further including,
  a plurality of closed compartments which are arranged circumferentially around the center axis, wherein at least one pendulum weight is arranged in each one of the plurality of closed compartments,
  wherein a channel for fluid is provided at least between two abutting closed compartments, as seen in the circumferential direction, and wherein the channel for fluid fluidly connects the two abutting closed compartments.

15 Claims, 5 Drawing Sheets

(56) References Cited

U.S. PATENT DOCUMENTS

| | | | |
|---|---|---|---|
| 10,247,274 B2 | 4/2019 | Dinger | |
| 10,989,272 B1 * | 4/2021 | Leone | F02D 13/06 |
| 2009/0131178 A1 * | 5/2009 | Dogel | F16F 15/16 |
| | | | 464/27 |
| 2009/0133529 A1 * | 5/2009 | Kister | F16F 15/162 |
| | | | 464/27 |
| 2015/0276014 A1 * | 10/2015 | Aijima | F16F 15/145 |
| | | | 74/572.2 |

FOREIGN PATENT DOCUMENTS

| | | | | |
|---|---|---|---|---|
| CN | 104781580 A | 7/2015 | | |
| CN | 105822722 A | 8/2016 | | |
| CN | 106662206 A | 5/2017 | | |
| CN | 107076260 A | 8/2017 | | |
| CN | 108119605 A | 6/2018 | | |
| DE | 19831154 A1 | 1/2000 | | |
| DE | 102015215910 A1 | 2/2017 | | |
| DE | 102016205765 A1 | 10/2017 | | |
| DE | 102018117964 A1 * | 1/2019 | ......... | F16F 15/1338 |
| JP | 2020094614 A * | 6/2020 | | |

OTHER PUBLICATIONS

Chinese First Office Action dated Mar. 9, 2022 for Chinese Patent Application No. 201980095524.4, 8 pages (including English summary).

International Search Report and Written Opinion of the International Searching Authority, PCT/EP2019/060654, mailed Jan. 24, 2020, 11 pages.

* cited by examiner

CENTRIFUGAL PENDULUM ABSORBER

CROSS REFERENCE TO RELATED APPLICATIONS

This application is a 35 U.S.C. § 371 national stage application of PCT International Application No. PCT/EP2019/060654 filed on Apr. 25, 2019, the disclosure and content of which is incorporated by reference herein in its entirety.

TECHNICAL FIELD

The invention relates to a centrifugal pendulum absorber for a flywheel. The invention further relates to a flywheel arrangement for an internal combustion engine and to a vehicle.

The invention can be applied in vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

It is known to connect a flywheel to a crankshaft of an internal combustion engine for a vehicle. The flywheel is used for evening out uneven power output from the engine, which is caused by uneven power output from each cylinder of the engine during the cylinder's combustion cycle.

It is further known to connect a centrifugal pendulum absorber to the flywheel for reducing vibrations from the crankshaft. Vibrations have been found to be more common for more fuel efficient engines. By the trend of reducing fuel consumption, engine vibrations have thereby become a more common issue in modern vehicles. Centrifugal pendulum absorbers for flywheels include a number of pendulum weights arranged circumferentially around a center axis of the flywheel, which pendulum weights are movable with respect to the flywheel, thereby dampening vibrations.

An example of a centrifugal pendulum device is disclosed in DE102016205765 A1. It discloses a centrifugal pendulum device which comprises one or more pendulum masses which can perform pendulum motions relative to a carrier disc. It further comprises a buffer ring which is arranged between the rotation axis and the pendulum weights, wherein the ring can perform a frictional sliding movement relative to the carrier disk by the pendulum motions.

As for most mechanical components which are frequently used, a centrifugal pendulum absorber requires to be serviced and even certain parts thereof may need to be replaced and/or repaired after certain time due to wear. Regular maintenance is especially required when the centrifugal pendulum absorber is connected to larger engines providing high power outputs, such as engines for heavy-duty trucks.

To minimize service costs, it is desirable to increase the durability of the centrifugal pendulum absorber.

SUMMARY

In view of the above, an object of the invention is to provide a centrifugal pendulum absorber and/or a flywheel arrangement having improved durability and improved reliability during use.

According to a first aspect, the object is achieved by a centrifugal pendulum absorber according to embodiments herein. According to a second aspect, the object is achieved by a flywheel arrangement according to embodiments herein. According to a third aspect, the object is achieved by a vehicle according to embodiments herein.

According to the first aspect thereof, the object is achieved by a centrifugal pendulum absorber for a flywheel, comprising,
a plurality of pendulum weights being arranged circumferentially around a center axis of the centrifugal pendulum absorber, wherein the centrifugal pendulum absorber further comprises:
a plurality of closed compartments which are arranged circumferentially around the center axis, wherein at least one pendulum weight is arranged in each one of the plurality of closed compartments,
wherein a channel for fluid is provided at least between two abutting closed compartments, as seen in the circumferential direction, and wherein the channel for fluid fluidly connects the two abutting closed compartments.

By the provision of the centrifugal pendulum absorber as disclosed herein, a more durable and reliable function during use is achieved. More particularly, it has been realized that by providing the pendulum weights in closed compartments, the pendulum weights can be efficiently lubricated, by e.g. grease, which has shown to improve durability and also reliability during use. Certain parts may be affected by wear when the pendulum weights are moving. By lubricating contacting surfaces, wear may be reduced, resulting in improved durability and also improved reliability during use. Further, by providing a channel for fluid as disclosed herein at least between two abutting closed compartments, the amount of lubricant may be efficiently balanced between the closed compartments. Hence, it has further been realized that providing balancing channels for the lubricant, even further improved durability and reliability may be achieved. Hence, according to an embodiment, the at least two abutting closed compartments may together form one closed space which accommodates lubricant. Further, by the at least one channel for fluid, lubricant may not necessarily need to be filled in each one of the closed compartments. Hence, it may be sufficient to only fill with lubricant at one location, and thereafter, during rotation, lubricant may be provided to all connected closed compartments. Thereby, time required for manufacturing and/or servicing may be reduced.

Optionally, a channel for fluid may be provided between each two abutting closed compartments, as seen in the circumferential direction, wherein each channel for fluid fluidly connects each two abutting closed compartments. Thereby, balancing the amount of lubricant may be performed between all of the closed compartments of the centrifugal pendulum absorber. Hence, and still optionally, the closed compartments may be fluidly connected around the complete circumference of the centrifugal pendulum absorber.

Optionally, the channel for fluid may be provided at a radial top region between the two abutting closed compartments. In fact, it has been realized that due to centrifugal forces lubricant tends to move radially outwards from the center axis. Thereby, by providing the channel for fluid at a radial top region, i.e. a radially outermost region, lubricant flow between the closed compartments may be further improved.

Optionally, the channel for fluid may have a main extension in a circumferential extension of the centrifugal pendulum absorber. Still optionally, a flow direction of any portion of the channel for fluid may not deviate from a corresponding tangential direction of the centrifugal pendulum absorber by more than 30 degrees.

Optionally, the centrifugal pendulum absorber may further comprise a ring member extending in the circumferential direction thereof and adapted for being connected to the flywheel, wherein the channel for fluid is at least partly provided in the ring member. It has been found that it may be efficient for manufacturing reasons to provide the channel in a separate ring member of the centrifugal pendulum absorber. Still optionally, the ring member may comprise at least one connection portion adapted for connecting the ring member to the flywheel, which at least one connection portion extends radially inwardly towards the center axis, and wherein the channel for fluid is at least partly provided in the at least one connection portion. Still optionally, the ring member may define a radially outer wall for the plurality of closed compartments. Still optionally, the at least one connection portion may extend radially inwardly towards the center axis and in-between two abutting closed compartments. Thereby, the at least one connection portion may optionally define a circumferential end wall for at least one closed compartment. Still optionally, the ring member may be made of a steel alloy, preferably a bearing steel, which provides high strength and durability. Still optionally, the flywheel may be made of iron, such as cast iron, preferably grey cast iron. Hence, it has been found to be preferred to provide the ring member and the flywheel with different materials.

Optionally, at least one of the pendulum weights may comprise at least one bearing surface adapted to cooperate with at least one corresponding bearing surface of the centrifugal pendulum absorber for allowing the pendulum weight to follow a predetermined pendulum path during use, which at least one bearing surface of the pendulum weight is provided on a radially outer side of the pendulum weight. It has namely been found that providing the bearing surfaces on a radially outer side of the pendulum weights whilst also providing the pendulum weights in closed compartments, the bearing surfaces which are subjected to wear during use can be efficiently lubricated, and thereby wear can be reduced. It has further been realized that providing the channel for fluid and the cooperating bearing surfaces in a radial top region is beneficial, since lubrication of the contacting surfaces will be further improved. Still optionally, the at least one of the pendulum weights which comprise the at least one bearing surface may comprise two circumferentially offset bearing surfaces which are provided on the radially outer side of the at least one pendulum weight. Still optionally, the at least one of the pendulum weights which comprises the at least one bearing surface may comprise a rolling element interposed in-between the cooperating bearing surfaces. The rolling element is preferably a roller element, but may for example also be a ball.

The predetermined pendulum path herein lies within a plane perpendicular to the center axis. The predetermined pendulum path may be a tautochrone curve.

Optionally, the cooperating bearing surfaces may be formed to provide a tautochronic pendulum motion of the pendulum weight during use. Still optionally, in the case a rolling element is provided in-between the bearing surfaces, the cooperating bearing surfaces and the rolling element may be formed and/or dimensioned to provide a tautochronic pendulum motion of the pendulum weight during use.

Optionally, the closed compartments may comprise lubricant, preferably grease, even though other lubricants also may be used, such as oil.

According to the second aspect thereof, the object is achieved by a flywheel arrangement for an internal combustion engine, comprising,
  a flywheel configured to be connected to a crankshaft of an engine for common rotation around a center axis, and
  the centrifugal pendulum absorber according to any one of the embodiments of the first aspect.

Advantages and effects provided by the flywheel arrangement are largely analogous to the advantages and effects provided by the first aspect of the invention. It shall also be noted that each embodiment of the first aspect of the invention is applicable with each embodiment of the second aspect of the invention and vice versa.

Optionally, the flywheel arrangement may further comprise a cover plate provided on a side face of the flywheel, wherein the plurality of closed compartments are enclosed by the side face of the flywheel and the cover plate. Still optionally, the channel for fluid may at least partly be provided in the cover plate. Still optionally, the channel for fluid may at least partly be provided in the side face of the flywheel.

According to the third aspect thereof, the object is achieved by a vehicle comprising the centrifugal pendulum absorber according to any one of the embodiments of the first aspect or the flywheel arrangement according to any one of the embodiments of the second aspect.

Advantages and effects provided by the vehicle are largely analogous to the advantages and effects provided by the first and second aspects of the invention. It shall also be noted that each embodiment of the first and second aspects of the invention is applicable with each embodiment of the third aspect of the invention and vice versa.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
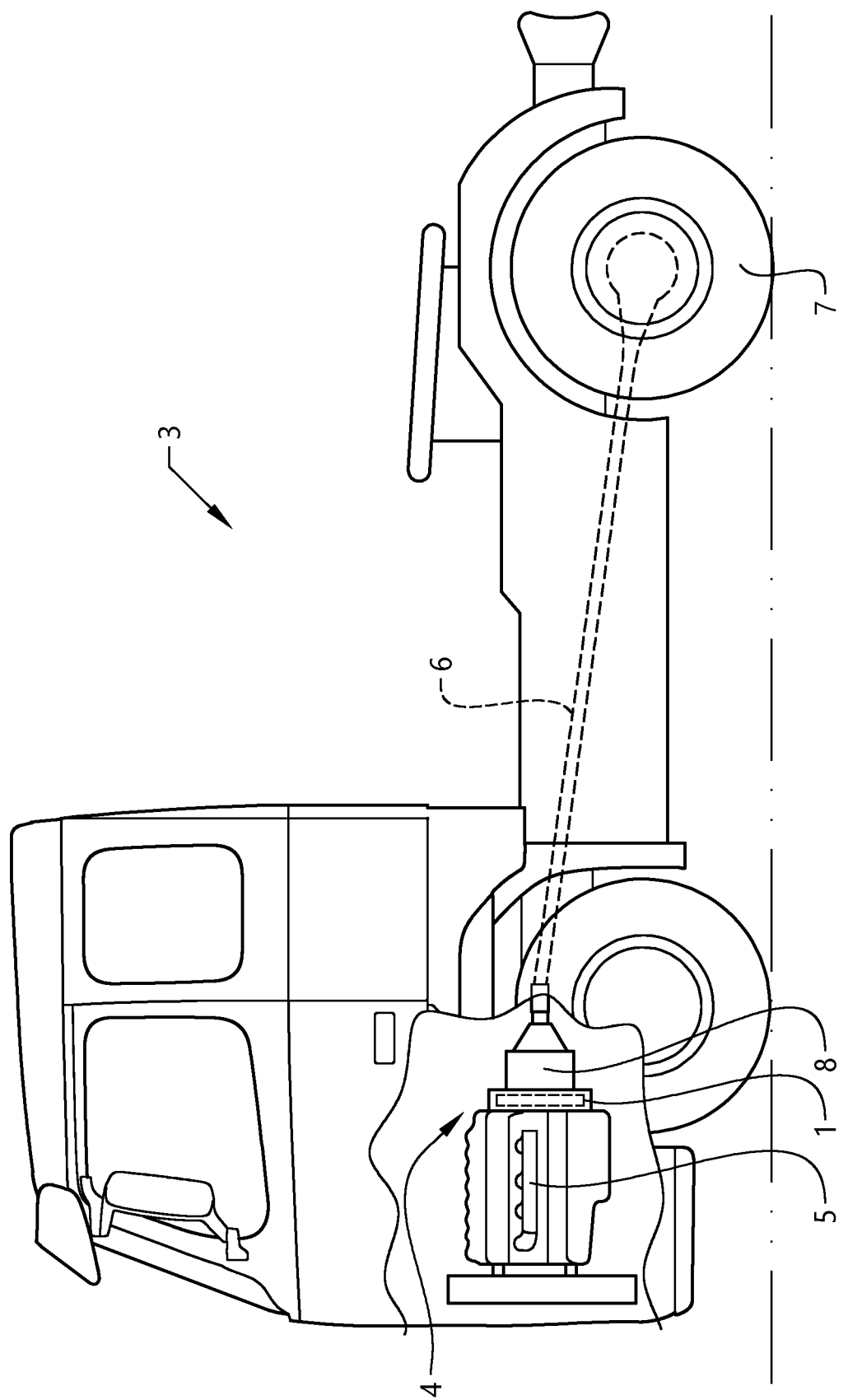
FIG. 1 schematically shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like

DETAILED DESCRIPTION OF EXAMPLE EMBODIMENTS OF THE INVENTION

FIG. 1 schematically shows a vehicle 3, in the form of a heavy-duty truck, according to an embodiment of the invention. The vehicle 3 includes a powertrain 4 with an engine 5 connected to a crankshaft (not shown), to which a flywheel arrangement 1 is connected for common rotation. A drive shaft 6 connects the engine 5 to driving wheels 7 of the vehicle 3 via a transmission 8 connected to the flywheel via a clutch (not shown).

Figure 2:
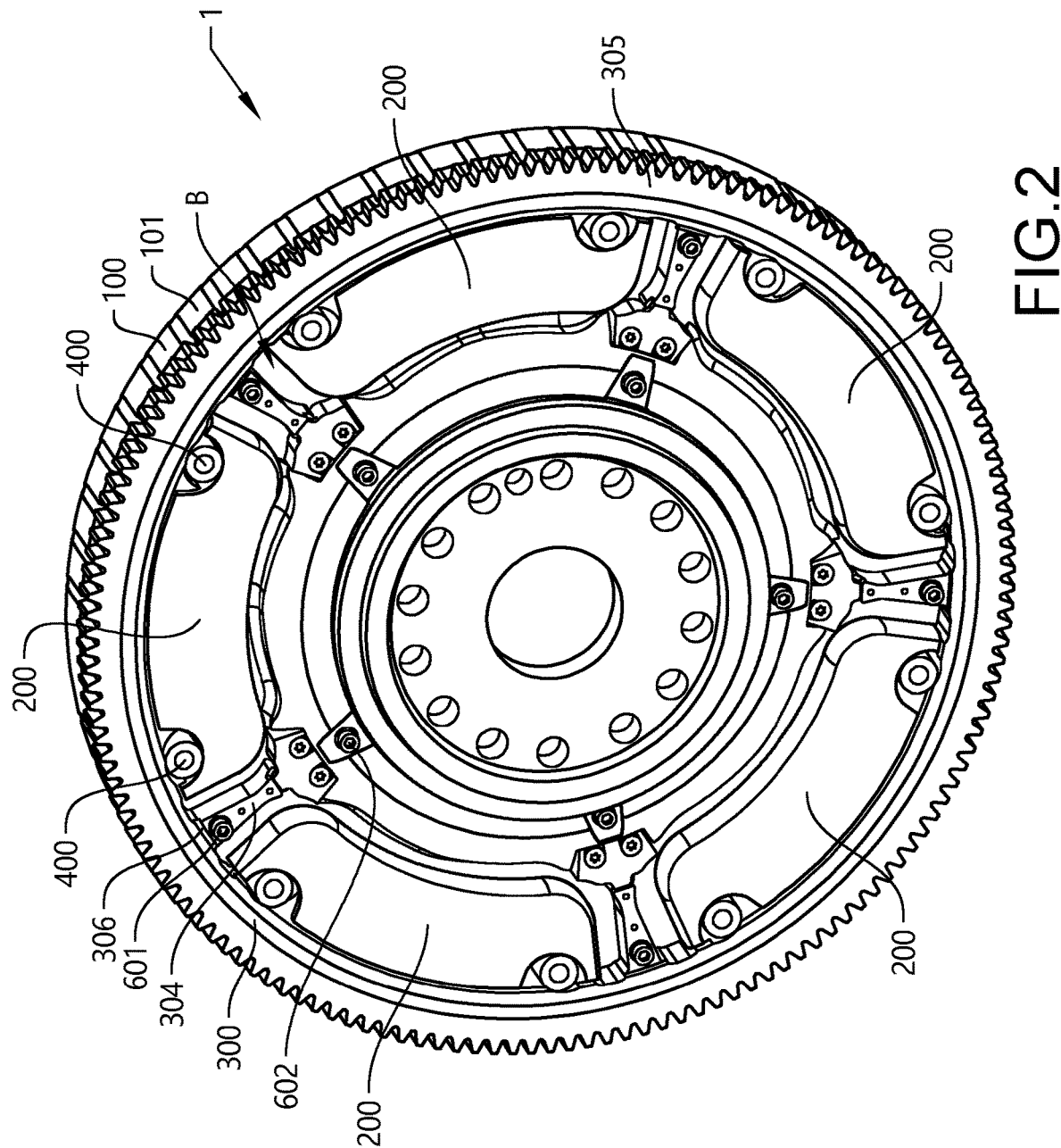
FIG. 2 is a perspective view of a flywheel arrangement according to an embodiment of the invention.
Figure 3:
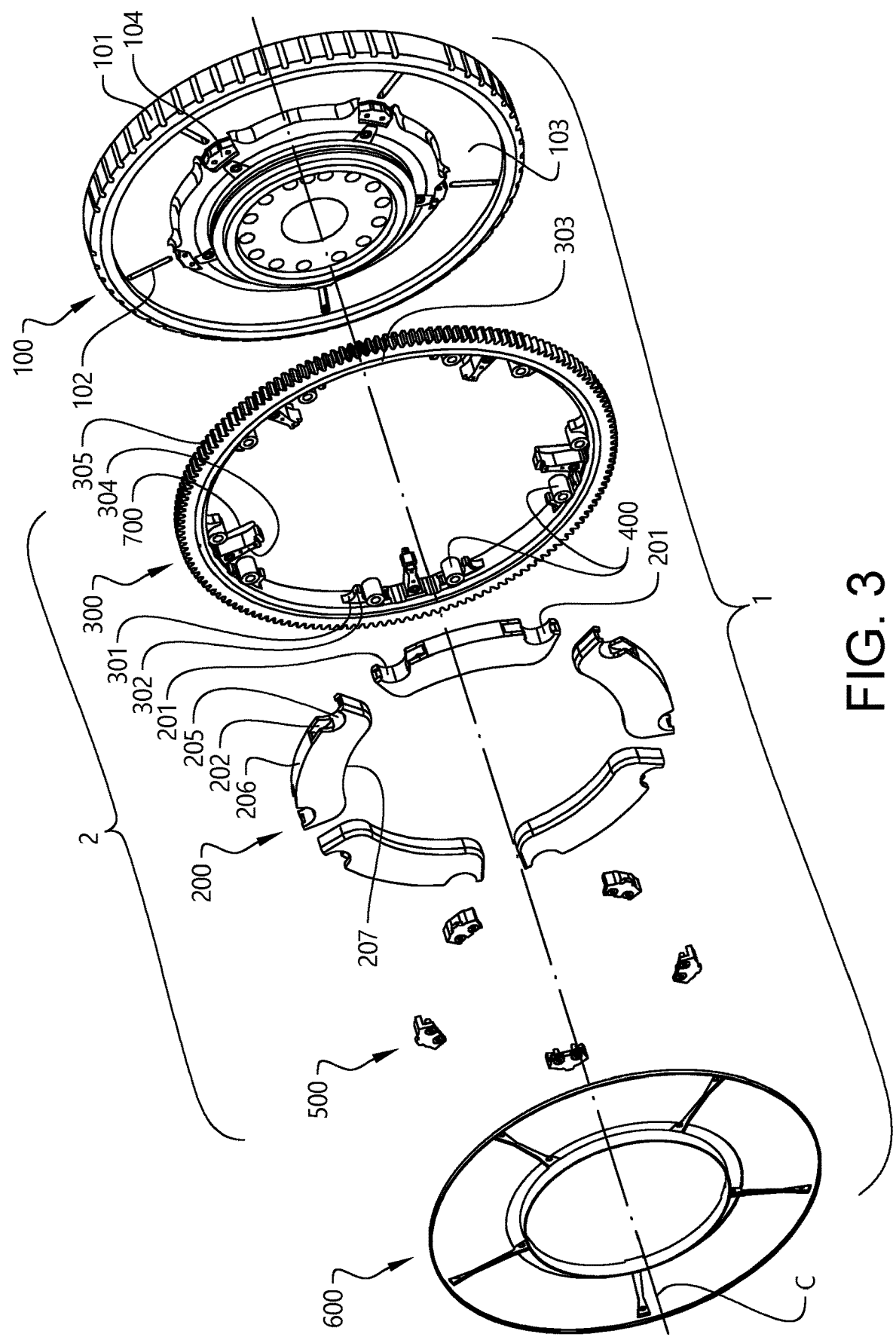
FIG. 3 is an exploded view of the flywheel arrangement in FIG. 2.
Figure 4:
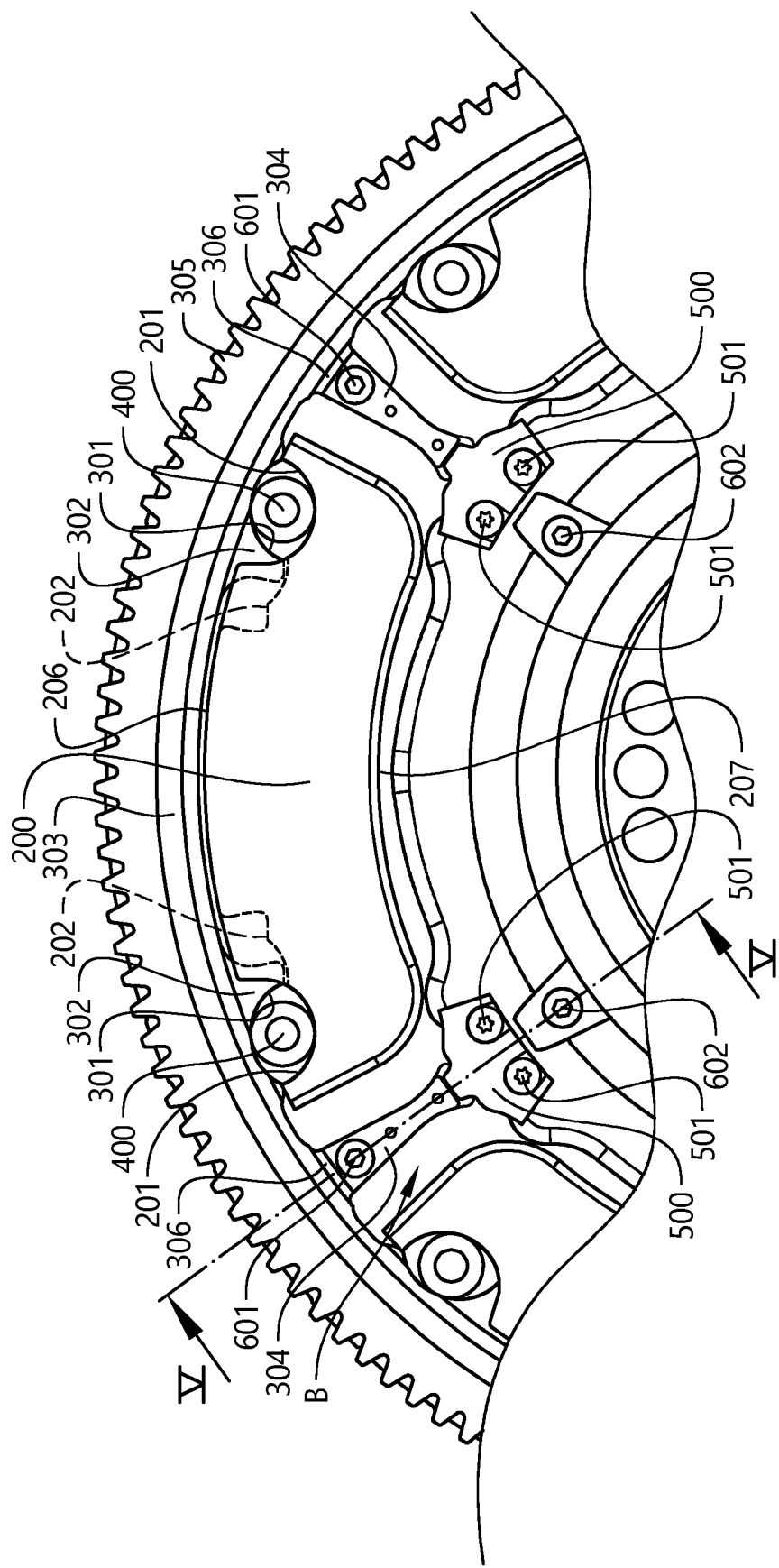
FIG. 4 is a planar view showing a portion of the flywheel arrangement in FIG. 2.

A flywheel arrangement 1 according to an embodiment of the invention is shown in closer detail in FIG. 2. Reference is also made to FIG. 3, in which the flywheel arrangement 1 is shown in an exploded view, and to FIG. 4, showing a portion of the flywheel arrangement in closer detail. The flywheel arrangement 1 comprises a flywheel 100 configured to be connected to a crankshaft of an engine for common rotation around a center axis C, and a centrifugal pendulum absorber 2. The centrifugal pendulum absorber 2 comprises a plurality of pendulum weights 200 which are arranged circumferentially around the center axis C, and each pendulum weight is configured to be movable along a predetermined pendulum path during use. In this embodiment, there are five pendulum weights 200, even though there may be fewer and more pendulum weights, which are circumferentially arranged between the center axis C and a radially peripheral surface 101 of the flywheel 100, facing a side face 103 of the flywheel 100. The centrifugal pendulum absorber 2 further comprises a separate ring member 300 which extends in the circumferential direction and is located radially outside the pendulum weights 200. The ring member 300 comprises an annular main portion 303 which has five connection portions 304 which connects the ring member 300 to the flywheel 100 via connection apertures 102 on the flywheel 100. The annular main portion 303 is preferably press-fitted into the flywheel 100. The connection portions 304 extend radially inwardly between each two circumferentially abutting pendulum weights 200. Further, the ring member 300 is preferably made of bearing steel, which is for example beneficial for producing bearing surfaces 301 of the ring member 300 with high precision. The flywheel 100 on the other hand is preferably made of iron, such as cast iron, preferably grey cast iron. In this way, high thermal conductivity and good damping properties are achieved.

Figure 5:
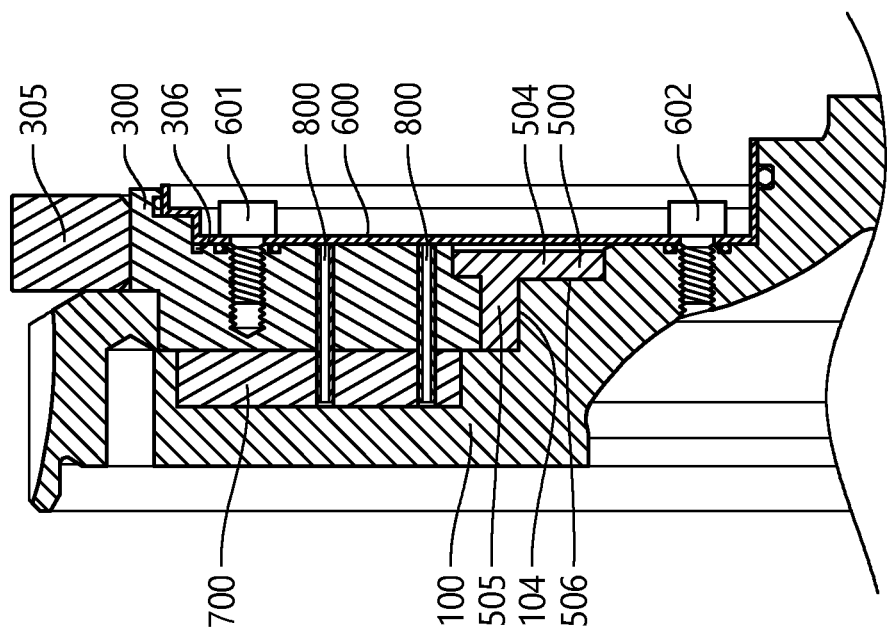
FIG. 5 is a cross-section along the line V-V in FIG. 4.

The flywheel arrangement 1 further comprises a cover plate 600 provided at an axial side face 103 of the flywheel 100 to cover the pendulum weights 200 from an outside environment. The cover plate 600 is here attached to the ring member 300 via a screw 601 and to the flywheel 100 via a screw 602. The flywheel 100, the ring member 300 and the cover plate 600 together form five closed compartments B which sealingly enclose each respective pendulum weight 200. Thereby, the closed compartments B can be filled with lubricant (not shown), which preferably is grease. In this embodiment, the ring member 300 defines a radially outer wall for the plurality of closed compartments B. The cover plate 600 is shown in FIGS. 3 and 5, and has been omitted in FIGS. 2 and 4 to more clearly show the other parts of the flywheel arrangement and the centrifugal pendulum absorber.

Furthermore, the connection portions 304 define circumferentially opposing end walls for each closed compartment B. To improve lubrication and to balance the amount of grease between the closed compartments B, a channel for fluid 306 is provided between each two abutting closed compartments B, as seen in the circumferential direction, and the channels for fluid 306 fluidly connects each two abutting closed compartments. Hence, the closed compartments B together form one closed space which accommodates lubricant. Each channel for fluid 306 further has its main extension in the circumferential extension of the flywheel arrangement 100.

Each pendulum weight 200 has a basic shape of an annulus sector as seen in a plane (or section) perpendicular to the central axis C. Thus, an outer peripheral surface 206 of the pendulum weight 200, facing the ring member 300, is a convex surface with a first radius of curvature, and an inner peripheral surface 207 of the pendulum weight 200 is a concave surface with a second radius of curvature, which is smaller than the first radius of curvature. Inner bearing surfaces 201 are provided on recesses 205 formed in the outer peripheral surface 206 of the pendulum weight 200. The bearing surfaces 201 are adapted to cooperate with corresponding bearing surfaces 301 of the ring member 300 for allowing the pendulum weight to follow a predetermined pendulum path during use. The bearing surfaces 301 of the ring member 300 are provided on a radially outer side with respect to each pendulum weight 200. For each pendulum weight 200 there is two circumferentially offset bearing surfaces 301 on the ring member 300 cooperating with corresponding circumferentially offset bearing surfaces 201 on the pendulum weight 200. Still further, rolling elements 400 are interposed in-between the cooperating bearing surfaces. The rolling elements 400 are here in the form of roller elements. There are two circumferentially separated rolling elements 400 for each pendulum weight 200. According to an embodiment, this may be denoted a bifilar pendulum configuration. Optionally, the pendulum motion may be a so called tautochronic pendulum motion.

The ring member 300 of this embodiment further comprises a plurality of protrusions 302 extending radially inwards from the annular main portion 303. The outer bearing surface 301 is formed at least partly on such a protrusion 302. The pendulum weight 200 comprises two pockets 202 formed in the outer peripheral surface 206 in connection with each of the inner bearing surfaces 201, wherein each pocket 202 is configured to receive a portion of one of the protrusions 302 during use of the flywheel arrangement 1, when the pendulum weight 200 moves along the predetermined pendulum path.

The centrifugal pendulum absorber 2 further comprises at least one stopping element 500 for at least one of the pendulum weights 200 which is positioned such that it defines an end point of the predetermined pendulum path, at which end point the at least one of the pendulum weights is configured to come into contact with the at least one stopping element. Further, according to this embodiment, at least a portion of the at least one stopping element which is intended to contact the at least one pendulum weight 200 comprises a copper alloy, such as brass and/or bronze. Thereby, the impact force exerted on the stopping element 500 can be efficiently dampened during use. In this embodiment, five stopping elements 500 are provided for the five pendulum weights 200. Hence, each one of the stopping elements 500 is configured to provide end points for the respective predetermined pendulum paths of two circumferentially abutting pendulum weights. Furthermore, in this embodiment, each stopping element 500 connects each connection portion 304 to the flywheel 100.

With respect to especially FIG. 3, it can be seen that the five stopping elements 500 are separate elements. Hence, by making the stopping elements 500 as separate elements, they may more easily be replaced when e.g. worn, which is beneficial for servicing. The stopping elements 500 are in this particular embodiment attached to the flywheel arrangement 1 by screws 501, although any other type of means for attaching may be used.

As can be further seen, the stopping elements 500 are in this embodiment located radially inwardly with respect to the pendulum weights 200 which the stopping elements 500 are configured to contact during use. Thereby, more space is provided for the pendulum weights 200 at a radially outward location. By providing the stopping elements 500 at this location, the pendulum motion for each pendulum weight 200 can be provided by the cooperating bearing surfaces 201, 301 of the weights 200 and of the separate ring member 300, respectively. Thereby, the cooperating bearing surfaces 201, 301 can be efficiently lubricated in this radially outer space, due to that centrifugal forces will force lubricant to move outwards during rotation of the centrifugal pendulum absorber 2. The improved lubrication will in turn reduce wear, and thereby durability and reliability may be increased.

Still further, in the embodiment shown in FIGS. 2-4, each stopping element 500 is provided between two circumferentially abutting pendulum weights 200 and positioned such that it defines respective end points of the predetermined pendulum paths of the two circumferentially abutting pendulum weights 200, at which end points the two abutting pendulum weights are configured to come into contact with the stopping element 500. Still further, as shown in this embodiment, each stopping element 500 is made in one single piece, although they also may be made by more than one piece.

As can be further seen, each stopping element 500 is provided in a receiving section 104 of the flywheel 100 which circumferentially locates each stopping element 500 with respect to the flywheel 100. The receiving section 104 is in the form of a recess on the flywheel 1, providing a seat surface for the stopping element 500. The receiving section 104 defines the position for the stopping element 500, resulting in a robust connection to the flywheel 100. Further, the receiving section 104 has shown to facilitate servicing and maintenance operations since it provides a predetermined position for the stopping element 500. Thereby, a technician may not need to spend unnecessary time on positioning each stopping element 500 during maintenance/repair work.

Further, each stopping element 500 comprises two apertures 502, 503 and each stopping element 500 is connected to the flywheel 1 by the two connection members 501, here in the form of screws, provided in the apertures. The two apertures 502, 503 are circumferentially offset relative each other.

FIG. 5 shows a cross sectional view along the line V-V of the flywheel arrangement 100 as e.g. shown in FIG. 4. The cross section is taken along a plane which is defined by the center axis C and a second axle which intersects and is perpendicular to the center axis C. As can be seen, the stopping element 500 is provided at a radially inward location. As can be further seen, the stopping element 500 is formed by a first radially extending portion 504 and a second axially extending portion 505. The two portions 504, 505 define a connection surface 506 for the stopping element 500, which in this embodiment is L-shaped. Thereby, the connection surface 506 together with the receiving section 104 provides a reliable connection interface. Still further, in this embodiment, the stopping element has a somewhat T-shaped configuration in its cross sectional view. More particularly, the first portion 504 extends radially upwards and radially downwards with respect to the second portion 505. As can be further seen, the first portion 504 has a main extension radially downwards with respect to the second portion 505. This configuration has shown to further facilitate assembly work, and also to provide a robust connection. The part of the first portion 504 which extends radially upwards with respect to the second portion 505 is here configured to be in contact with the radially inwardly extending connection portion 304 of the ring member 300, thereby providing improved axial retention for the ring member 300.

Further in FIG. 5, one of the channels for fluid 306 is shown. The channel 306 is here provided as a circumferentially extending recess on the connection portion 304 of the ring member 300 which is covered by the cover plate 600. It shall however be understood that the channels 306 may be provided at any member located between each two abutting closed compartments B. Further, the channel 306 is provided at a radial top region between the closed compartments B. Thereby, grease can more easily flow between the closed compartments B when the flywheel arrangement 1 is rotating. Further, the channel for fluid 306 will be provided close to the cooperating bearing surfaces 201, 301, which also are located at a radial top region. A number of sealing elements, preferably O-rings, are also provided for efficiently sealing off the closed compartments B, thereby avoiding lubricant leakage during use.

A plurality of key members 700 are further provided, by means of which the ring member 300 is secured to the flywheel 100. Each key member 700 is, as shown in a sectional view in FIG. 5, fitted into a radially extending keyseat 102 provided in the flywheel 100 and each key member 700 is further attached to the radially extending connection portion 304 of the ring member 300 using fastening members in the form of e.g. nails, pins or screws via a hole 800 extending through the ring member 300 and at least partly into the key member 700. The key members 700 and the ring member 300 may thus be formed as separate pieces, but they may also be formed in one piece. The key members 700 and the ring member 300 may be made of the same material.

The ring member 300 further comprises a ring gear 305, which may be a separate part or which may be formed integrally with the ring member 300.

Figure 6:
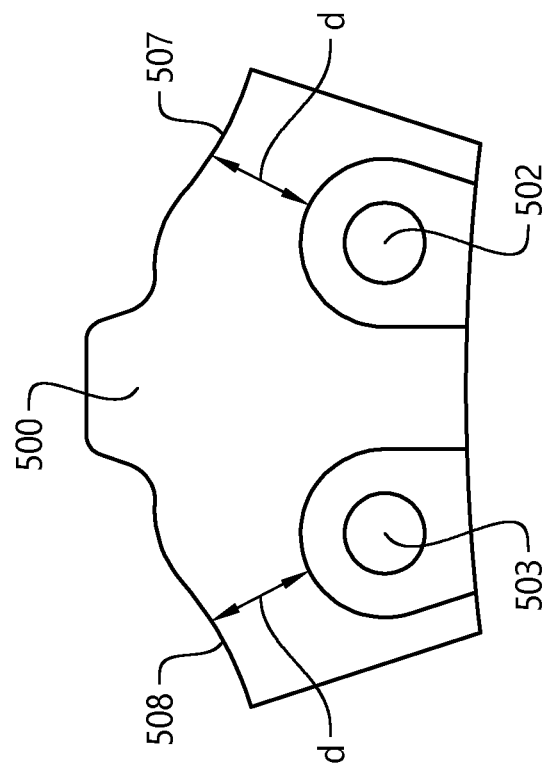
FIG. 6 is an enlarged view of a stopping element according to an embodiment of the invention.

In FIG. 6, an enlarged view of a stopping element 500 is shown. The stopping element comprises two apertures 502, 503 for receiving e.g. screws 501 as explained in the above. The complete stopping element 500, i.e. 100 volume %, is made of bronze, thereby providing beneficial dampening properties during use. Still further, a smallest distance d between each aperture 502, 503 and its respective closest contact surface, 507 and 508, of the stopping element 500 which is intended to contact one of the pendulum weights 200 is here substantially 10 millimeters.

It is to be understood that the present invention is not limited to the embodiments described above and illustrated in the drawings; rather, the skilled person will recognize that many changes and modifications may be made within the scope of the appended claims.

The invention claimed is:

1. A centrifugal pendulum absorber for a flywheel, comprising:

a plurality of pendulum weights being arranged circumferentially around a center axis of the centrifugal pendulum absorber, a plurality of closed compartments which are arranged circumferentially around the center axis, wherein at least one pendulum weight is arranged in each one of the plurality of closed compartments, and a ring member extending in a circumferential direction thereof and adapted for being connected to the flywheel, wherein a channel for fluid is provided between at least one pair of abutting closed compartments of the plurality of closed compartments, as seen in the circumferential direction, wherein the channel for fluid is at least partly provided in the ring member, and wherein the channel for fluid fluidly connects the at least one pair of abutting closed compartments, wherein the ring member comprises at least one connection portion adapted for connecting the ring member to the flywheel, which at least one connection portion extends radially inwardly towards the center axis between the at least one pair of abutting closed compartments, and wherein the channel for fluid is at least partly provided in the at least one connection portion.

2. The centrifugal pendulum absorber according to claim 1, wherein the channel for fluid comprises a plurality of channels, wherein the plurality of closed compartments comprises a plurality of pairs of abutting closed compartments, and wherein at least one channel of the plurality of channels is provided between each pair of abutting closed compartments, as seen in the circumferential direction, and wherein each channel for fluid fluidly connects each pair of abutting closed compartments.

3. The centrifugal pendulum absorber according to claim 1, wherein the channel for fluid is provided at a radial top region between the at least one pair of abutting closed compartments.

4. The centrifugal pendulum absorber according to claim 1, wherein the channel for fluid has a main extension in a circumferential extension of the centrifugal pendulum absorber.

5. The centrifugal pendulum absorber according to claim 1, wherein the ring member defines a radially outer wall for the plurality of closed compartments.

6. The centrifugal pendulum absorber according to claim 1, wherein at least one of the pendulum weights comprises at least one bearing surface adapted to cooperate with at least one corresponding bearing surface of the centrifugal pendulum absorber for allowing the pendulum weight to follow a predetermined pendulum path during use, which at least one bearing surface of the pendulum weight is provided on a radially outer side of the pendulum weight.

7. The centrifugal pendulum absorber according to claim 6, wherein the at least one of the pendulum weights comprises two circumferentially offset bearing surfaces which are provided on the radially outer side of the at least one pendulum weight.

8. The centrifugal pendulum absorber according to claim 6, further comprising a rolling element interposed in-between the cooperating bearing surfaces.

9. The centrifugal pendulum absorber according to claim 6, wherein the cooperating bearing surfaces are formed to provide a tautochronic pendulum motion of the pendulum weight during use.

10. A flywheel arrangement for an internal combustion engine, comprising, a flywheel configured to be connected to a crankshaft of an engine for common rotation around a center axis, and the centrifugal pendulum absorber according to claim 1.

11. The flywheel arrangement according to claim 10, further comprising a cover plate provided on a side face of the flywheel, wherein the plurality of closed compartments are enclosed by the side face of the flywheel and the cover plate.

12. The flywheel arrangement according to claim 11, wherein the channel for fluid is at least partly provided in the cover plate.

13. The flywheel arrangement according to claim 11, wherein the channel for fluid is at least partly provided in the side face of the flywheel.

14. A vehicle comprising the centrifugal pendulum absorber according to claim 1.

15. A vehicle comprising the flywheel arrangement according to claim 10.

* * * * *